Oct. 24, 1939. J. R. DESCH 2,177,133
MEASURING INSTRUMENT
Filed Nov. 25, 1936 2 Sheets-Sheet 1

Inventor
Joseph R. Desch

Oct. 24, 1939.         J. R. DESCH              2,177,133
                    MEASURING INSTRUMENT
                   Filed Nov. 25, 1936       2 Sheets-Sheet 2

INVENTOR.
JOSEPH R. DESCH,
BY Toulmin & Toulmin
ATTORNEY.

Patented Oct. 24, 1939

2,177,133

UNITED STATES PATENT OFFICE 2,177,133

MEASURING INSTRUMENT

Joseph R. Desch, Dayton, Ohio, assignor to Commonwealth Engineering Corporation, Wilmington, Del., a corporation of Delaware Application November 25, 1936, Serial No. 112,680

8 Claims. (Cl. 88—14)

This invention relates to measuring instruments, and in particular, to such instruments employing light-sensitive devices for indicating the measurements of the instrument.

One object of this invention is to provide a measuring instrument wherein deviations from a standard measurement are indicated by the different readings of a light-sensitive device, the supply of light to which is responsive to such deviations.

Another object is to provide a measuring instrument wherein light is partially intercepted by the object being measured, and partially permitted to pass onward, varying with the deviation of the object being measured from a predetermined measurement or standard in such a manner that these deviations cause corresponding deviations in the readings or indications of the light-sensitive device.

Another object is to provide a measuring instrument having means for projecting parallel light past at least one point of the object to be measured, a portion of the light being intercepted by the object and a portion being permitted to pass to a light-sensitive device, such as a photoelectric cell, the indications of which are responsive to the quantity of light reaching the cell.

Another object is to provide a measuring instrument consisting of a collimating system for producing parallel light rays, and another optical system for receiving at least a portion of the parallel light rays and directing them to a light-sensitive device, such as a photoelectric cell, the indications of which are proportional to the amount of light reaching the cell, the object to be measured being placed upon a movable support and adapted thereby to intercept a portion of the light in comparison with the light intercepted by a different standard size, the variation between the reading given for the standard object and that given by the object under test indicating the departure from the standard measurements.

Another object is to provide a measuring instrument having an optical system with optical elements adapted to project parallel rays of light in an elongated form, such as by employing cylindrical lenses or mirrors in cooperation with an elongated slit, these rays being passed over and at least partially intercepted by a standard object and by an object under test, the rays being allowed to pass, impinging upon a photoelectric cell the readings of which are in proportion to the amount of light so received, thereby indicating the departure from the measurements of the standard object.

In the drawings:

Figure 4 is an enlarged vertical section forming a portion of Figure 1.

Figure 5 is a cross section along the line 5—5 in Figures 1 and 4.

Figure 6 is a section along the line 6—6 in Figure 1.

Figure 7 is a section along the line 7—7 in Figure 1.

In general, the measuring instrument of this invention consists of a light source adapted to project substantially parallel rays, a support for the object to be tested and for the standard of comparison, and a light-sensitive device adapted to receive all or a portion of any rays which may be permitted to pass by the object or standard of comparison, as the case may be. The light-sensitive device may consist of a photoelectric cell which is sensitive to and responsive to the reception of different quantities of light to give different indications.

Figure 1:
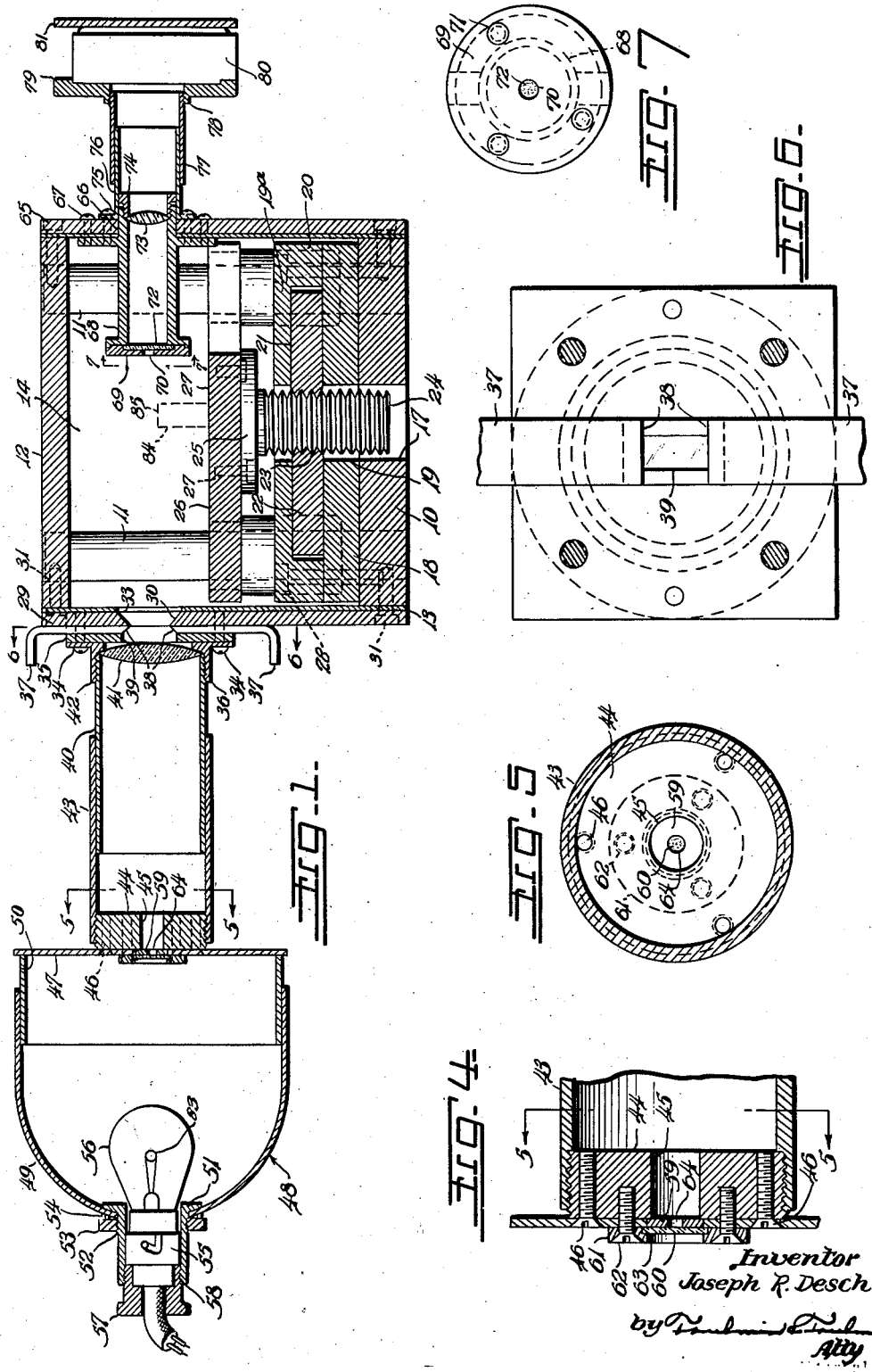
Figure 1 is a central vertical section through the measuring instrument of this invention.
Figures 2, 3:
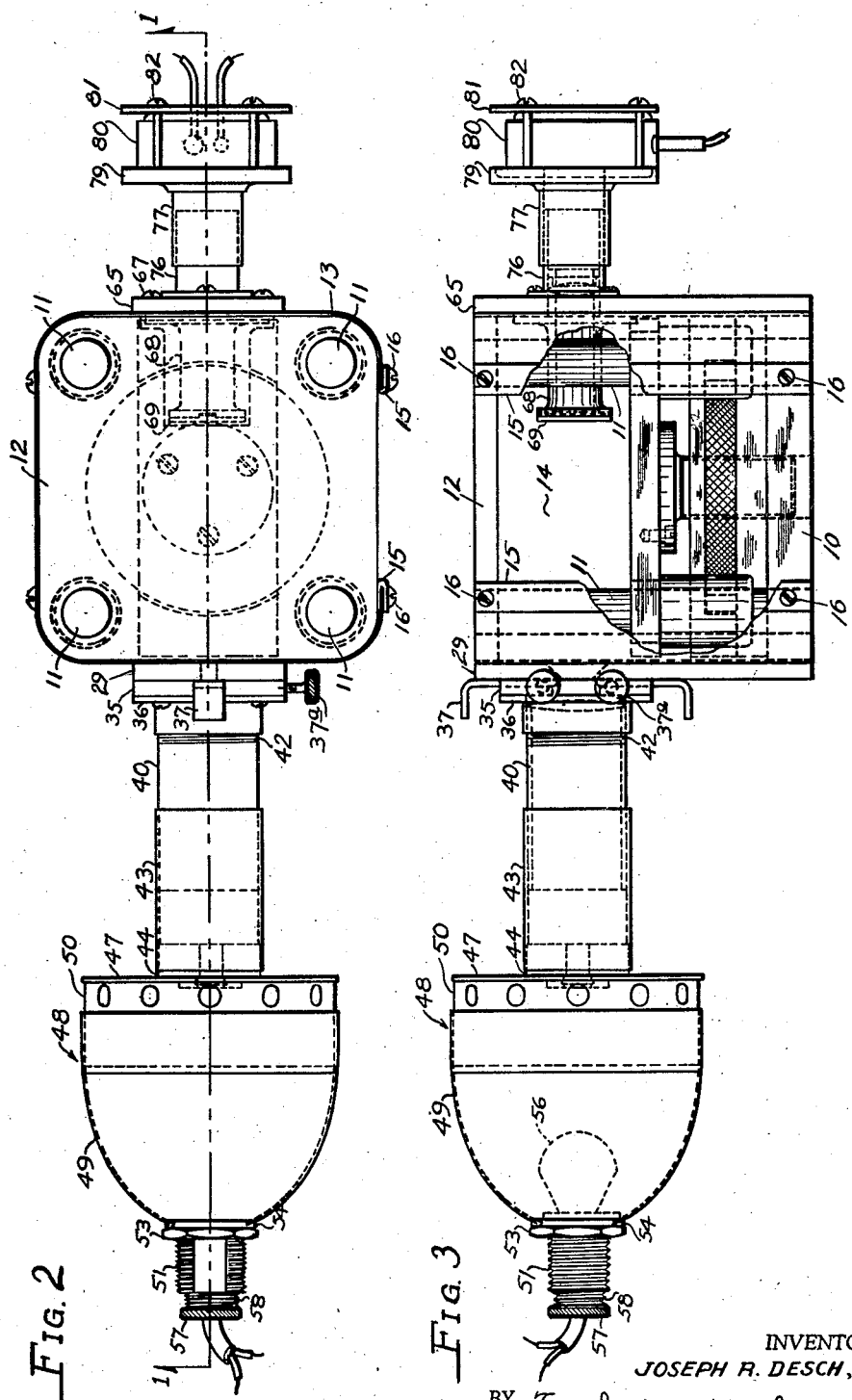
Figure 2 is a top plan view of the measuring instrument shown in Figure 1.
Figure 3 is a side elevation, partly broken away, of the measuring instrument shown in Figure 1.

Referring to the drawings in detail, Figures 2 and 3 show the exterior of the light-measuring device as consisting of a base 10 having pillars 11 rising therefrom and terminating in a top plate 12. Arranged to form a side wall between the base 10 and the top plate 12 is a member 13, almost entirely surrounding the base 10 and top plate 12 so as to form a dark chamber 14 therebetween. The member 13, which is of sheet material, terminates in the portions 15, forming opposite edges of the doorway to the dark chamber 14 and secured to the base 10 and top plate 12 by the screws 16 (Figure 3). The base 10 (Figure 1) is provided with a vertical bore 17 over which is mounted a plate 18 having a corresponding and aligned bore 19. Mounted above the plate 18 is a second plate 19a having a downwardly-projecting flange 20 of such a nature as to provide a recess 21 within which is mounted a knurled nut 22, having a threaded portion 23 engaging the threads of a screw shaft 24. The upper end of the screw shaft 24 is provided with an enlarged head 25 to which is secured a table 26, as by the screws 27. The members 18 and 19a are secured to the base 10 by the screws 28 (Figure 1).

The base 10 and top plate 12 are interconnected by a side plate 29 having an aperture 30 therethrough, and secured by the screws 31 to the base 10 and top plate 12. The side wall member 13 is likewise provided with an aperture 33 aligned with the inner end of the aperture 30. The latter tapers and converges outwardly. Secured to the side plate 29, as by the screws 34, is a guide member 35 and likewise a flanged support 36. The guide member 35 is spaced from the side plate 29 in such a manner as to form a passageway for the reception of a pair of sliding members 37 having bottom edges 38 which are beveled to provide a sharp edge. The guide member 35 is provided with an aperture 39 (Figure 6) adapted to be closed and opened by the transverse movement of the members 37, in accordance with the will of the operator.

On the flanged support 36 is mounted a tubular member 40 having at the end adjacent the aperture 39 a convex lens 41. The tubular member 40 is threaded into the flanged member 36, as at 42. Slidably mounted upon the tubular member 40 is a tubular member 43 having threaded therein a disc 44 with a central aperture 45 therein. Secured to the disc 44, as by the screws 46, is the end member 47 of a light source, generally designated 48, and having a curved reflector 49 slidably mounted upon the cylindrical flange 50 projecting from the portion 47. The reflector 49 terminates centrally in a flanged bushing 51 threaded, as at 52, and carrying a nut 53 securing it to the reflector, with the intermediate assistance of a washer 54. Secured within the flanged bushing 51 is a socket 55 adapted to receive an electric light bulb 56, and held in position by a plug 57 threaded, as at 58, into the outer end of the flanged bushing 51.

The disc 44 (Figure 4) is provided with a diaphragm 59 and a light-diffusing member 60, such as a piece of ground glass or opal glass, these being held in place by the retaining member 61 secured to the disc 44 by the screws 62. The retaining member 61 is provided with a central aperture 63, and the diaphragm is similarly provided with a central aperture 64. Secured to the base 10 and top plate 12, immediately opposite the side plate 29, is a side plate 65 provided with an aperture 66 within which is secured, as at 67, an inwardly-projecting flanged bushing 68. One end of this bushing has secured thereto an end closure 69, with a central aperture 70 (Figures 1 and 7), the screws 71 being adapted to secure the closure 69 to the flanged bushing 68 and to hold therewithin a light-diffusing member 72, such as a ground glass or an opal glass.

Mounted within the flanged bushing 68, at the opposite end thereof, is a convex lens 73, held in place by a threaded thimble 74. Surrounding the thimble 74 and secured by the screws 75 to the side plate 65 is a flanged tubular member 76, on which is slidably mounted a tubular member 77. The outer end of the latter is threaded, as at 78, and carries thereon a support 79 for a light-sensitive device 80, the whole being held in place by the retaining plate 81 and the screws 82. The light-sensitive device 80 may consist of a photoelectric cell, of a type giving readings upon a galvanometer or other suitable instrument which indicates the quantity of light, one such suitable type being known to those skilled in the art under the trade-name of a Weston Photronic cell. It will be understood, however, that other suitable types of cells or devices of this character may be employed.

In the adjustment of the device the reflector 49 is moved to and fro upon the flanged portion 50 until the filament 83 of the light bulb 56 properly illuminates the diffusing member 60 and the diaphragm 59. The tubular member 43 is then moved to and fro along the tubular member 40 until the aperture 64 in the diaphragm 59 is substantially at the principal focus of the lens 41 so that parallel rays will be projected into the dark chamber 14 by the lens 41. The tubular portion 77 of the support 79 for the photoelectric cell 80 is then moved to and fro upon the tubular member 76 until the cell 80, the lens 73 and the aperture 70 are in proper relationship. The members 37 are then moved to and fro until the space between them includes the desired amount of light.

The standard object which is to form the basis of comparison is then placed upon the table 26 and the latter is then adjusted vertically by rotating the knurled nut 22. The object thus mounted is indicated by the dotted lines 84 (Figure 1). This adjustment is made for the purpose of placing the upper edge 85 of the object 84 in a proper relationship relatively to the aperture 70 in the end closure 69. Under these conditions the aperture 64 in the diaphragm 59, the top edge 85 of the object 84 and the aperture 70 in the end closure 69 will be substantially in line with each other. The reading of the light-sensitive device 80 is then observed and recorded. While this measurement is being taken the dark chamber 14 is screened from the entrance of extraneous light either by using the entire instrument in a dark room or by covering it with an opaque screen or an opaque door member over the doorway between the portions 15 (Figure 3).

If now another object 84 of different height is placed upon the table in the same position as the previous object, a different amount of light will be intercepted by the object and hence a different amount will reach the photoelectric cell 80, causing a different reading thereof. If the height of the edge 85 of the second object is accurately known the difference between the two readings of the photoelectric cell 80 will be proportional to the difference in the heights of the edges 85 of the two objects above the top of the table 26. By using objects of different known heights, therefore, the scale of the photoelectric cell 80 can be calibrated in terms of the heights of these objects, or if desired, it can be given a direct reading scale in linear units.

If, now, an object whose height is to be measured is placed upon the table 26, assuming that the height of this object is sufficiently close to the height of the standard object by which the position of the table 26 was adjusted relatively to the aperture 70, the object of unknown height will intercept light in such a manner as to cause a certain reading of the photoelectric cell 80. Assuming that the scale of this instrument has been calibrated in the manner previously described, the height of the unknown object is immediately determinable by the position of the indicating needle upon the scale of the photoelectric cell 80, or by interpolating between known points on that scale. By the use of this instrument, therefore, the heights of standard objects and objects of unknown dimensions can be rapidly and accurately compared. Gauge blocks of high precision may be employed as standard objects, in which case the dimensions of the objects to be tested can be determined to a high degree of accuracy.

The lenses 41 and 73 of the optical system employed in connection with this instrument are shown of double convex form. It will be understood, however, that other forms of lenses and other types of optical systems for accomplishing substantially the same purpose may be employed. For example, the aperture 64 in the diaphragm 59 may be made in a narrow slit form and a cylindrical or other astigmatic type of lens may be employed in place of the double convex lens 41. Similarly, the double convex lens 73 may be replaced by a cylindrical lens, and the aperture 70 replaced by a slit.

The reflector 49 is of such a curvature that it focuses the light from the filament 83 of the light bulb 56 upon the ground glass member 60 at the aperture 64. In particular, when the reflector 49 is made in ellipsoidal form and the filament 83 is placed at one focus of the ellipsoid, the light from the filament will be reflected from the reflector in such a manner as to converge upon the other focus of the ellipsoid. As a consequence, when an ellipsoidal reflector is used, it is preferable to place the ground glass member 60 and aperture 64 in the vicinity of the other focus of the ellipsoidal reflector. The light-sensitive device of the type previously described is self-energized, and requires no external source of current for its operation. It will be understood, however, that other types of light-sensitive devices may be used, either with or without external energization.

It will be understood that I desire to comprehend within this invention such modifications as come within the scope of the claims and the invention.

Having thus fully described my invention, what I claim as new and desire to secure by Letters Patent, is:

1. In a measuring instrument, a base having an aperture, a threaded shaft in said aperture, a table connected to said threaded shaft, a threaded nut engaging said shaft, means for preventing vertical movement of said nut, a frame connected to said base, a radiation source adapted to project radiation past an object on said table, a transmitting tube defining a light path connecting said source to said frame, said tube comprising telescoping members attached to said light source and frame and a radiation-measuring device arranged to receive the radiation from said source passing said object.

2. In a measuring instrument, a base having an aperture, a threaded shaft in said aperture, a table connected to said threaded shaft, a threaded nut engaging said shaft, means located on opposite sides of said nut for preventing vertical movement of the nut with respect to the base, a frame connected to said base and having a plurality of pillars, a top plate mounted on said pillars, a side wall surrounding said table and extending between said top plate and said base for providing a dark chamber for said table, a radiation source connected to said frame and adapted to project radiation past an object on said table, a radiation-measuring device arranged to receive the radiation from said source passing said object and apertures in the wall, aligned respectively with the light source and radiation measuring device.

3. In a measuring instrument, means for forming a dark chamber, means for supporting an object to be measured within said dark chamber, means for projecting light across a portion of said object, and light-sensitive means responsive to the reception of light passing said object and calibrated to indicate a dimension of said object relatively to said supporting means, a lens supported adjacent said dark chamber and located between said light projecting means and said object, and a transmitting tube defining a light path connecting said source to said chamber, said tube comprising telescoping members attached to said light source and dark chamber, said object supporting means being entirely outside the beam and adapted to support said object in such manner that a portion of the light is intercepted by said object and a portion thereof passes around said object to said light-sensitive means.

4. In a measuring instrument, means for forming a dark chamber, means for supporting an object to be measured within said dark chamber, means for projecting light across a portion of said object, and light-sensitive means responsive to the reception of light passing said object and calibrated to indicated a dimension of said object relatively to said supporting means, said light-sensitive means comprising a self-energizing photo-electric cell, and a light transmitting tube defining a light path connected to said light projecting means and to said dark chamber, said object supporting means being entirely outside the beam, said object supporting means also being adjustable so as to support said object in such manner that a portion of said light is intercepted by the object and the balance passes around said object to said light-sensitive means.

5. In a measuring instrument, means for forming a dark chamber, means for supporting an object to be measured within said dark chamber, means for projecting light across a portion of said object, and light-sensitive means responsive to the reception of light passing said object and calibrated to indicate a dimension of said object relatively to said supporting means, said light source having a curved reflector and said dark chamber having an aperture, and a light-diffusing member located between said light source and said dark chamber, said object supporting means being entirely outside the beam and supporting said object in such manner that a portion of the light is intercepted by the object and a portion passes around said object to said light-sensitive means.

6. In a measuring instrument, means for forming a dark chamber, means for supporting an object to be measured within said dark chamber, means for projecting light across a portion of said object, and light-sensitive means responsive to the reception of light passing said object and calibrated to indicate a dimension of said object relatively to said supporting means, said light source having a curved reflector and said dark chamber having an aperture, a tube defining a light path connected to said light source and to said dark chamber at said aperture, and a light-diffusing member located between said light source and said dark chamber, said object supporting means being entirely outside the beam and adapted to support said object in such manner that it intercepts only a portion of said light and the balance of said light passes around said object to said light-sensitive means.

7. In a measuring instrument, a casing, a table located within said casing, a radiation source, a plate having an aperture aligned therewith, means for focusing the radiation from said source at said aperture, a lens focused upon said aperture, said casing having an opening associated with said lens, means associated with said opening for varying the effective area thereof and for limiting the radiation passing therethrough, a radiation-measuring device arranged for receiving and indicating the amount of radiation passing an object mounted upon said table, in the path of the radiation from said source and said lens, said area varying means comprising a pair of oppositely slidable members adapted to pass a ray bundle of predetermined cross section therebetween, the said ray bundle from said radiation source being projected into said casing in the direction of the said radiation measuring device, said table being adjustably mounted within the casing for supporting an object to be measured, and means for moving the table toward and away from said radiation path so as to position an object thereon in said path.

8. In a measuring instrument, a casing, a table located within said casing, a radiation source, a plate having an aperture aligned therewith, a lens focused upon said aperture, said casing having an opening associated with said lens, means associated with said opening for varying the effective area thereof and for limiting the radiation passing therethrough, a radiation-measuring device for indicating the amount of radiation passing an object mounted upon said table, in the path of the radiation from said source and said lens, a radiation diffusing element associated with said aperture, a reflector associated with said rediation source and focusing said radiation upon said element, the said ray bundle from said radiation source being projected into said casing in the direction of the said radiation measuring device, said table being adjustably mounted within said casing for supporting an object to be measured in such manner that it intercepts only a portion of the radiation from said source and said lens, and means for moving the table toward and away from said radiation path so as to position said object in said radiation path.

JOSEPH R. DESCH.